United States Patent [19]

Prodan

[11] Patent Number: 4,768,093
[45] Date of Patent: Aug. 30, 1988

[54] VERTICAL PRE-FILTER FOR PIP TELEVISION RECEIVERS

[75] Inventor: Richard S. Prodan, Peekskill, N.Y.

[73] Assignee: North American Philips Corporation, New York, N.Y.

[21] Appl. No.: 871,188

[22] Filed: Jun. 5, 1986

[51] Int. Cl.$^4$ .............................................. H04N 5/14
[52] U.S. Cl. ................................. 358/160; 358/140; 358/22
[58] Field of Search .................. 358/22, 36, 167, 160, 358/180, 183, 140, 11; 364/724

[56] References Cited

U.S. PATENT DOCUMENTS

| | | | |
|---|---|---|---|
| 3,729,579 | 4/1973 | DoBoer | 358/11 |
| 3,829,670 | 8/1974 | Kebabian | 364/724 |
| 4,282,546 | 8/1981 | Reitmeier | 358/22 |

FOREIGN PATENT DOCUMENTS

| | | | |
|---|---|---|---|
| 1,326,386 | 8/1973 | United Kingdom | 358/140 |
| 2126450 | 3/1984 | United Kingdom | 358/160 |

Primary Examiner—James J. Groody
Assistant Examiner—David E. Harvey
Attorney, Agent, or Firm—Edward W. Goodman; Gregory P. Gadson

[57] ABSTRACT

A vertical filter for filtering digital television signals in which the length of the filter may be greater than the decimation factor. The vertical filter includes a first and a second multiplier-accumulator section each having a multiplier for receiving each line in the digital television signal and for multiplying each line by a respective filter coefficient, a switch having a first input connected to an output of the multiplier, a line delay circuit connected to an output of the switch, and an adder circuit connected to the output of the multiplier and the line delay circuit. The vertical filter further includes a multiplexer connected to the outputs of the first and second multiplier-accumulator sections for alternatively applying the outputs of the first and second multiplier-accumulators to the output of the filter.

1 Claim, 4 Drawing Sheets

FIG. 4
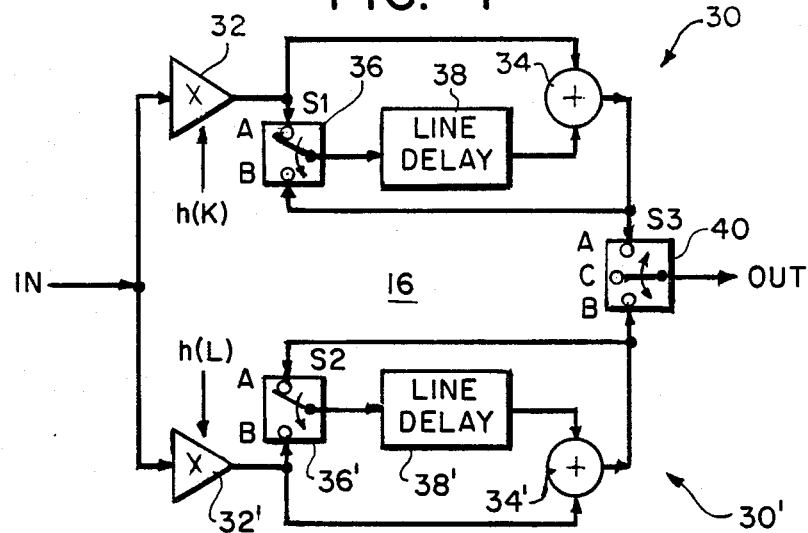
FIG. 5A
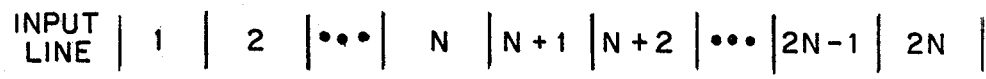
FIG. 5B
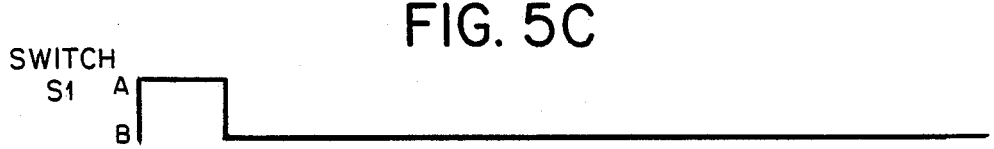
FIG. 5C
FIG. 5D
FIG. 5E

INPUT
LINE      | 1       | 2       | ... | N       | N+1     | N+2     | ... | 2N-1    | 2N      |
SAMPLE    | 1,2...M | 1,2...M |     | 1,2...M | 1,2...M | 1,2...M |     | 1,2...M | 1,2...M |

COEFFICIENTS
$h(K)$ | $h(N)$ | $h(N-1)$ | ... | $h(1)$   | $h(O)$ | $h(1)$   | ... | $h(N-2)$ | $h(N-1)$ |
$h(L)$ | $h(O)$ | $h(1)$   |     | $h(N-1)$ | $h(N)$ | $h(N-1)$ |     | $h(2)$   | $h(1)$   |

SWITCH
S2  A
    B

SWITCHES
S1,S3  A
       B

OUTPUT
VALID
  TRUE
  FALSE

VERTICAL PRE-FILTER FOR PIP TELEVISION RECEIVERS

BACKGROUND OF THE INVENTION

The present invention relates to television receivers and, more particularly, to television receivers having a picture-in-picture (PIP) feature, that is, receivers in which a small, compressed version of a video signal is displayed within a larger "main" picture.

In television receivers having a PIP feature, two channels are provided, namely, a main channel and a PIP channel. The main channel is a conventional television channel and receives an incoming composite television signal and furnishes a luminance and two color difference signals therefor. The PIP channel also receives a composite television signal, but instead processes the signal digitally. A digital, reduced version of the received picture is stored in a memory. This digital reduced version is read out from the memory, converted back to analog form, and the resulting color difference and luminance signals are combined with the corresponding signals from the main channel under control of a synchronous switching circuit. The combined signals are then converted to red, green and blue color signals for application to a display.

A vertical pre-filter is provided to process the digital television signal before it is stored in memory. Since the picture is to be displayed in a much smaller area than the main picture, sampling is required. However, sampling at less than the Nyquist frequency introduces low frequency beats. Also, the compressed signal, if not preprocessed, may be subject to line flicker and aliasing.

A U.S. Patent Application filed concurrently herewith and assigned to the Assignee of the subject application, discloses a vertical filter which carries out the low frequency filtering function reliably and with a minimum of components. However, the length of this vertical filter, that is, the number of television lines over which a weighted average can be taken, is limited to the line decimation factor. This is very restrictive in practice and compromises the quality of the resultant reduced picture.

SUMMARY OF THE INVENTION

An object of the present invention is to provide a vertical filter in which the length of the filter may be greater than the decimation factor. This object is achieved in a vertical filter having a multiplier-accumulator section including a multiplier having a first input for receiving each line in a digital television signal and a second input for receiving respective filter coefficients for each line applied to the first input of the multiplier, a switch having a first input coupled to an output of the multiplier, a line delay circuit coupled to an output of the switch, and an adder circuit having a first input coupled to the output of the multiplier and a second input coupled to an output of the line delay circuit, an output of the adder circuit forming an output of the multiplier-accumulator section and being coupled to a second input of the switch, characterized in that the vertical filter further comprises a further multiplier-accumulator section substantially identical to said multiplier-accumulator section, and means for multiplexing the outputs of said multiplier-accumulator section and said further multiplier-accumulator section.

Applicant recognized that by multiplexing the outputs from two multiplier-accumulators, a decimation factor of N may be achieved while the length of each multiplier-accumulator may be 2N, the operation of the multiplier-accumulators being conducted with a constant phase difference therebetween.

DESCRIPTION OF THE DRAWINGS

With the above and additional objects and advantages in mind as will hereinafter appear, the invention will be described with reference to the accompanying drawings, in which:

FIG. 4 is a schematic block diagram of an embodiment of a vertical filter of the subject invention;

FIGS. 5A-5E are signal and timing diagrams for the pre-filter circuit of FIG. 4;

DESCRIPTION OF THE PREFERRED EMBODIMENTS

Figure 1:
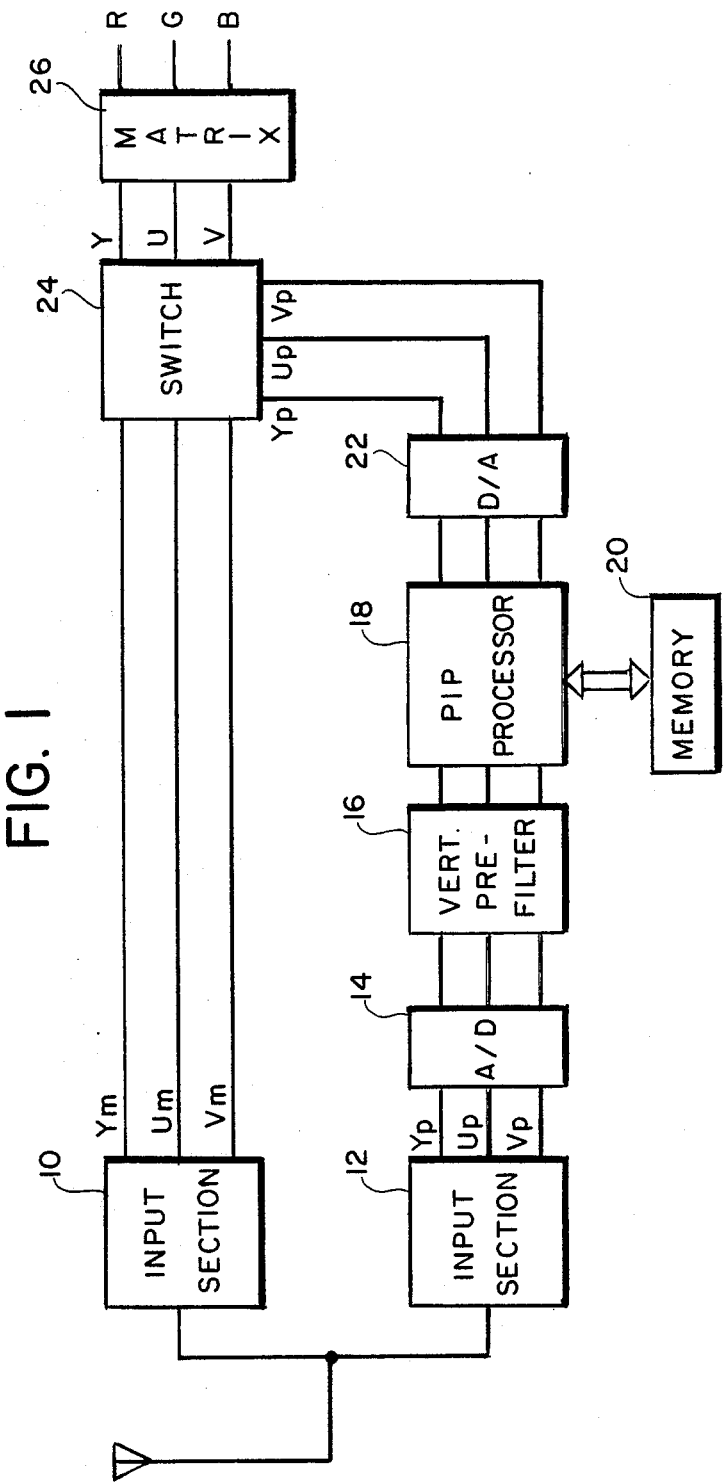
FIG. 1 is a schematic block diagram of a portion of a PIP television receiver.

A portion of a picture-in-picture (PIP) television receiver is shown in FIG. 1. The PIP television receiver is capable of displaying a main picture, substantially filling the area of the display, and, simultaneously, a PIP picture which is substantially smaller than the main picture and replaces a corresponding portion of the main picture. This PIP picture may be derived from a channel different from that of the main picture or from another input device, for example, a video tape recorder.

The PIP television receiver includes a main signal path having an input section 10 for receiving a main television signal and for supplying luminance (Ym) and chrominance (Um,Vm) signals constituting the main picture. The PIP television receiver further includes a PIP signal path also having an input section 12 for receiving a PIP television signal and for supplying luminance (Yp) and chrominance (Up,Vp) signals constituting the PIP picture. The signals Yp, Up, Vp are then applied to a analog-to-digital converter circuit 14 for separately digitizing these signals. The outputs from the analog-to-digital converter circuit 14 are applied to a vertical pre-filter circuit 16 for low-pass filtering.

The outputs from the vertical pre-filter circuit 16 are applied to a PIP processor 18 which applies every third scanning line therein to a PIP memory 20. The PIP memory 20 is then selectively read out in synchronism with the main channel and applies its outputs to a digital-to-analog converter circuit 22. These low-pass filtered, decimated signals Yp, Up, Vp are applied to a first set of inputs of a change-over switch 24, to a second set of inputs thereof the signals Y, U, V of the main signal path are applied. The outputs of the change-over switch 24 are applied to a matrix circuit 26 forming the color signals R, G, B for application to a display device (not shown).

Figure 2:
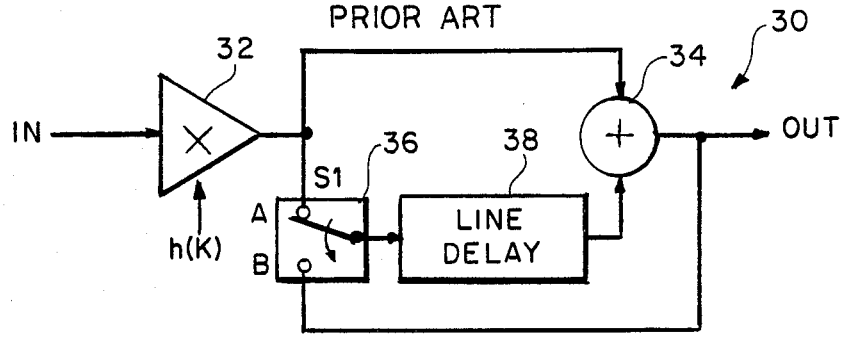
FIG. 2 is a schematic block diagram of a prior art vertical filter for use in the PIP television receiver.

FIG. 2 shows one channel 30 of a prior art vertical pre-filter which includes a scaler amplifier 32 for applying, successively, a set of coefficients h(K) to the lines in one of the signals Yp, Up, Vp. The output from amplifier 32 is applied to a first input of an adder 34 and to a first input of a switch 36, to a second input of which, the output of the adder 34 is applied. The output of the switch 36 is applied, via a line delay circuit 38 to a second input of the adder 34, the output of the adder 34 forming the output of the pre-filter.

Figure 3A:
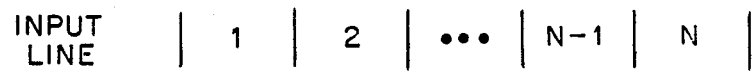
FIGS. 3A-3D are signal and time diagrams for the filter of FIG. 2.
Figure 3B:
Figure 3C:
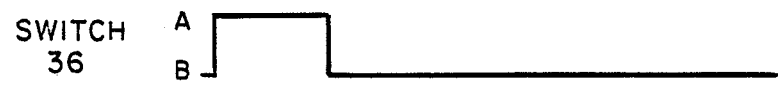
Figure 3D:

FIG. 3A shows the input lines to the vertical pre-filter of FIG. 2, in which the line numbers represent the decimation factor of the pre-filter. FIG. 3B shows the corresponding coefficients h(K). FIG. 3C shows the timing for switch 36, while FIG. 3D shows the timing of the line to be selected by the PIP processor. As should be apparent, the length of the pre-filter is equal to the decimation factor.

FIG. 4 shows one channel of the vertical pre-filter circuit 16 of the subject invention. This channel of the vertical pre-filter circuit 16 includes the vertical pre-filter channel 30 as described above and a second vertical pre-filter channel 30' substantially identical thereto and including scaler amplifier 32' and corresponding coefficients h(L), adder 34', switch 36', and line delay circuit 38'. This channel of the vertical pre-filter circuit 16 also includes a multiplexer 40 shown as a selector switch having a first input connected to the output of channel 30, a second input unconnected, and a third input connected to the output of channel 30', the output of multiplexer 40 forming the output of this channel of the vertical pre-filter 16.

FIG. 5A shows the input lines to the vertical pre-filter circuit 16, in which the line numbers represent the length of the pre-filter. FIG. 5B shows the corresponding coefficients h(K) and h(L). FIGS. 5C and 5D show the timing of switches 36 and 36'; note that with respect to the input line numbers, the switch 36 is operated at line number 1 while switch 36' is operated at line number N. Finally FIG. 5E shows the timing and positions of the multiplexer 40. It should be apparent that the length of each channel 30 and 30' of the vertical pre-filter circuit 16 is 2N while the decimation factor is N.

In operation, the two channels 30 and 30' are multiplexed with a constant phase difference. The sampled scan lines x(n) provide a common input to each of the channels. In the channel 30, the sampled scan line x(1) is multiplied by h(N) in the scaler 32. The product is routed through switch 36, which is initially in position A, to the input of the line delay circuit 38. As shown in FIG. 5C, switch 36 is changed to position B for subsequent scan lines. After 2N lines, the line delay circuit 38 contains the weighted sum: h(N)×(1)+h(N−1)×(2)+. . . +h(0)×(N+1) +h(1)×(N+2)+. . . +h(N−1)×(2N). The process repeats with line 2N+1 initializing the data in the line delay circuit 38 while simultaneously adding the same term h(n)×(2N+1) to the convolutional sum at the output of the adder 34. Thus the filtered output is produced periodically during initialization of the channel 30 every 2N scan lines. The channel 30' operates identically to channel 30 except that the initialization and concurrent output are delayed by precisely N input lines. Multiplexer 40 multiplexes the outputs of the two channels alternating between them every N lines for one output line time. This vertical pre-filter circuit 16 filters the input scan lines with a linear phase filter of length 2N+1 while decimating the output by a factor N. Thus the filter length limit of N lines in the prior art vertical pre-filter has been increased to 2N+1 lines for the same decimation rate N in the vertical pre-filter circuit 16 of the subject invention.

Figures 6, 7A, 7B, 7C, 7D, 7E:
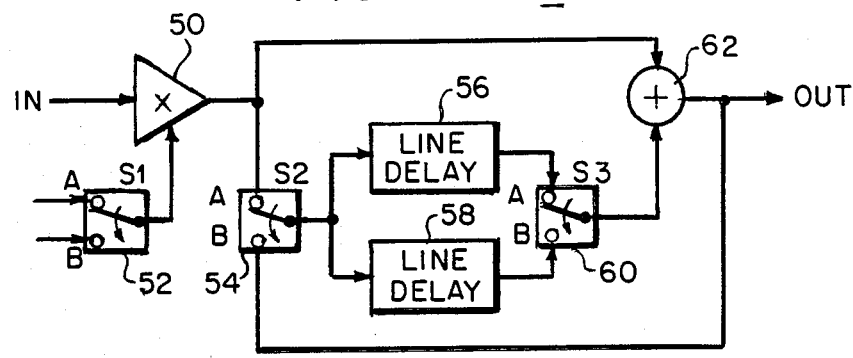
FIG. 6 is a schematic block diagram of another embodiment of a vertical filter of the subject invention.
FIG. 7A-7E is a timing diagram illustrating the operation of the vertical filter of FIG. 6.

FIG. 6 shows an alternate embodiment of the vertical pre-filter 16. A scaler amplifier 50 receives the input lines. A selector switch 52 output is applied to the scaling input of the amplifier 50 while the coefficients h(K) and h(L) are respectively applied to two inputs of the switch 52. The output of amplifier 50 is applied to a first input of switch 54, the output of which is applied to a first and second line delay circuits 56 and 58. The outputs of line delay circuits 56 and 58 are applied to the inputs, respectively, of a switch 60, the output of which being applied to an input of an adder 62 which receives at its second input the output of amplifier 50. The output of the adder 62 is applied to a second input of switch 54.

As shown in FIG. 7A, each input line consists of M input samples. Each individual is then divided into two equal periods. These half-sample periods define a stable state of the three switches 52, 54 and 60. Each switch is either in position A or B for an entire half-sample period, but may switch position at the beginning or in the middle of any sample within the input line. This allows two distinct operations to be performed on each sample during a single sample period.

Switches 52 and 60, as shown in FIG. 7D continually toggle between position A during each first half-sample period to position B during each second half-sample period. The output of switch 52 supplies the coefficients h(K) and h(L) to the amplifier 50 during the first and second half of each sample period, respectively. This produces two multiplications for each sample in the input line, one product for the line delay circuit 56 and the other for the line delay circuit 58. Switch 60 similarly supplies the output of the line delay circuit 56 during the first half-sample period and the output of the line delay circuit 58 during the second half-sample period to one input of the adder 62. The other input of the adder 62 is provided by the output of the amplifier 50. During the first half-sample period, the output of the adder 62 is the present sample of the input line multiplied by h(K) plus the output sample of the line delay circuit 56. During the second half-sample period, the output of the adder 62 is the same sample of the input line multiplied by h(L) plus the output sample of the line delay circuit 58. Switch 54, as shown in FIG. 7C, supplies either the adder output or the amplifier 50 output to the input of the line delay circuits 56 and 58 on alternate half-sample periods. Switch 54 is in position A during the first half-sample periods of input line 1 and the second half-sample periods of input line N+1 corresponding to the initialization and concurrent valid output of the channels 30 and 30', respectively. The above described operation repeats periodically every 2N scan lines. During the valid output periods, the filtered and decimated output scan line samples produced are identical to those produced in the vertical pre-filter circuit of FIG. 4.

Numerous alterations of the structure herein disclosed will suggest themselves to those skilled in the art. However, it is to be understood that the present disclosure relates to a preferred embodiment of the invention which is for purposes of illustration only and not to be construed as a limitation of the invention. All such modifications which do not depart from the spirit of the invention are intended to be included within the scope of the appended claims.

What is claimed is:

1. A vertical filter comprising a multiplier having a first input for receiving each line in a digital television signal and a second input for receiving respective filter coefficients for each line applied to the first input of the multiplier, a first switch having a first and a second input for receiving, respectively, a first and a second set of said filter coefficients and an output coupled to said second input of said multiplier, a second switch having a first input coupled to an output of said multiplier, and an output coupled to, respectively, a first and a second line delay circuit, a third switch having a first and a second input coupled to said first and second line delay circuits, respectively, and an adder circuit having a first input coupled to the output of said multiplier and a second input coupled to an output of said third switch, an output of said adder circuit being coupled to a second input of said second switch and forming an output of said vertical filter.

* * * * *